United States Patent
Lee et al.

(10) Patent No.: US 12,088,186 B2
(45) Date of Patent: Sep. 10, 2024

(54) SWITCH CONTROL CIRCUIT AND SWITCH CONTROL METHOD THEREOF

(71) Applicant: Magnachip Mixed-Signal, Ltd., Cheongju-si (KR)

(72) Inventors: Jang Hyuck Lee, Seongnam-si (KR); Joo Han Yoon, Seongnam-si (KR)

(73) Assignee: Magnachip Mixed-Signal, Ltd., Cheongju-si (KR)

( * ) Notice: Subject to any disclaimer, the term of this patent is extended or adjusted under 35 U.S.C. 154(b) by 238 days.

(21) Appl. No.: 17/842,919

(22) Filed: Jun. 17, 2022

(65) Prior Publication Data

US 2023/0113675 A1    Apr. 13, 2023

(30) Foreign Application Priority Data

Oct. 8, 2021    (KR) .................. 10-2021-0133993

(51) Int. Cl.
*H02M 3/156*    (2006.01)
*H02M 1/00*    (2006.01)
*H02M 3/158*    (2006.01)

(52) U.S. Cl.
CPC ....... *H02M 1/0025* (2021.05); *H02M 1/0009* (2021.05); *H02M 3/158* (2013.01)

(58) Field of Classification Search
CPC ..... H02M 1/0003; H02M 1/0025; H02M 3/01
See application file for complete search history.

(56) References Cited

U.S. PATENT DOCUMENTS

| 9,502,975 B2 | 11/2016 | Shin et al. | |
| 2006/0284607 A1* | 12/2006 | Isobe | H02M 3/156 323/282 |
| 2008/0203988 A1* | 8/2008 | Horikawa | H02M 3/156 323/282 |
| 2015/0028830 A1* | 1/2015 | Chen | H02M 3/1588 323/271 |
| 2021/0021191 A1 | 1/2021 | Lee et al. | |

FOREIGN PATENT DOCUMENTS

| KR | 10-2015-0106044 A | 9/2015 |
| KR | 10-2021-0010241 A | 1/2021 |

* cited by examiner

*Primary Examiner* — Alex Torres-Rivera
(74) *Attorney, Agent, or Firm* — NSIP Law

(57) ABSTRACT

A switch control circuit and switch control method are provided. The switch control circuit and switch control method compensate an error of a load current that occurs because of the changing of a slope of an inductor current based on the increase and decrease of an input voltage. The switch control circuit includes a current compensation device that adjusts a gate on time based on a RC resistor and a control signal that senses a gate terminal of a control switch. The current compensation device compensates an error that occurs due to a signal delay to a gate terminal by increasing or decreasing a reference voltage or a sensing voltage, according to an increase or a decrease of an input voltage.

8 Claims, 11 Drawing Sheets

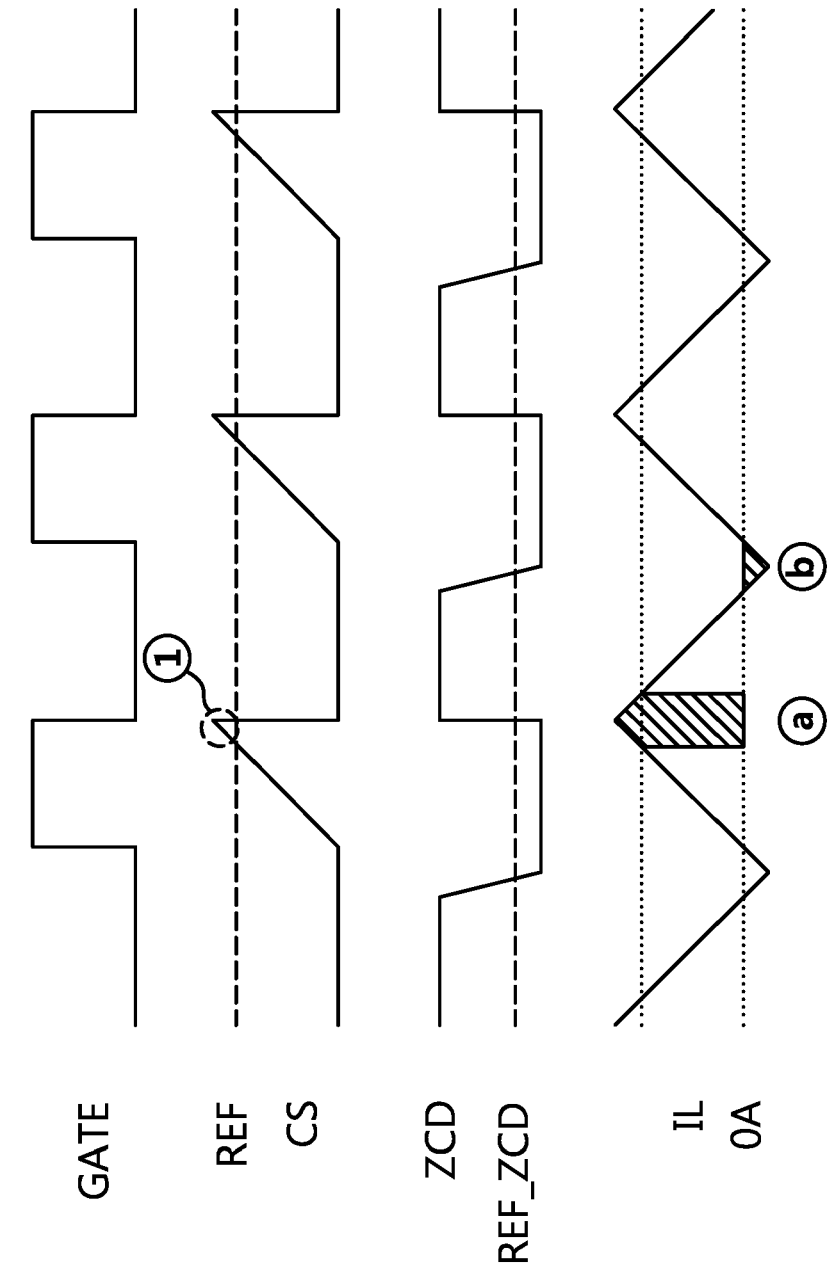

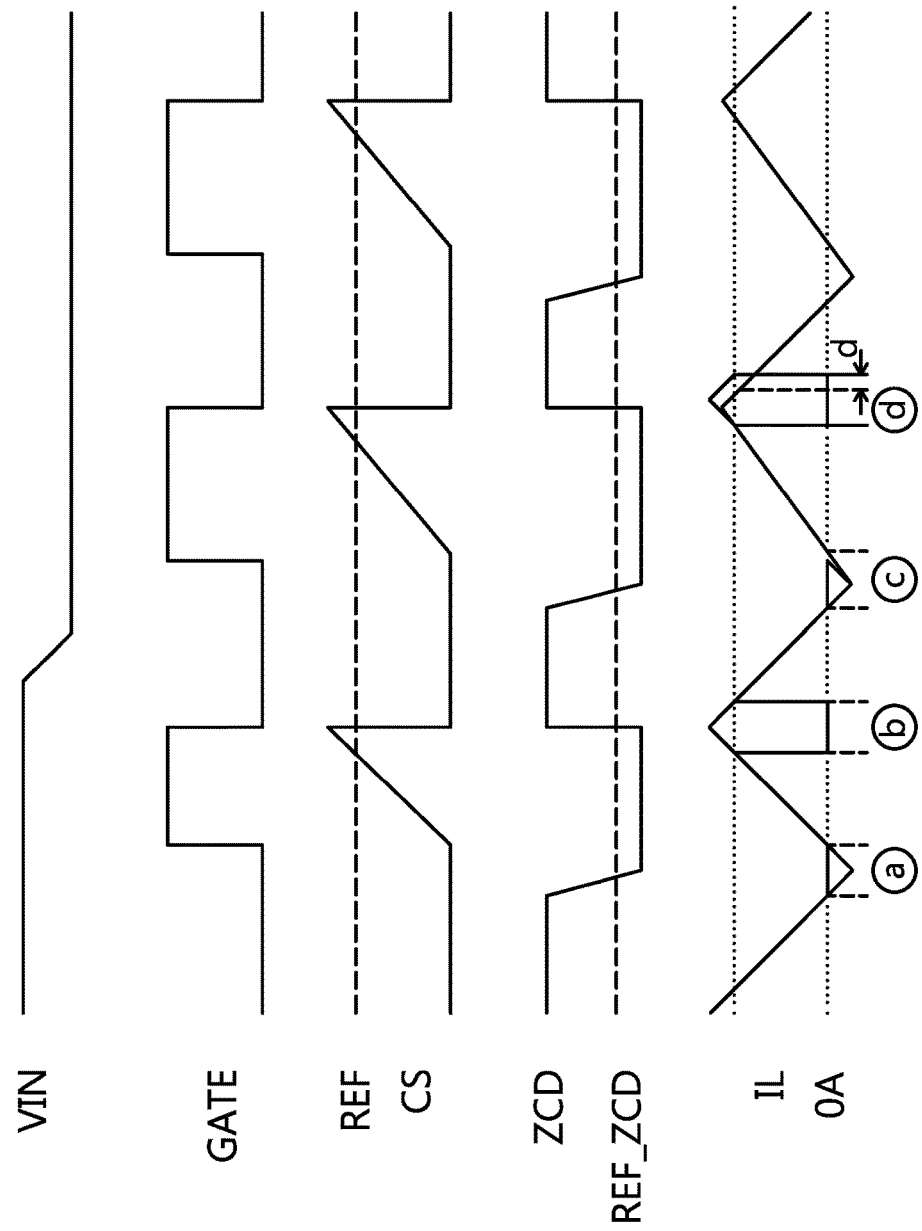

SWITCH CONTROL CIRCUIT AND SWITCH CONTROL METHOD THEREOF

CROSS-REFERENCE TO RELATED APPLICATIONS

This application claims the benefit under 35 U.S.C. § 119 of Korean Patent Application No. 10-2021-0133993 filed on Oct. 8, 2021, in the Korean Intellectual Property Office, the entire disclosure of which is incorporated herein by reference for all purposes.

BACKGROUND

1. Field

The following description relates to a switch control circuit and switch control method thereof.

2. Description of Related Art

A switch control circuit may refer to a circuit that controls a current flowing into a load (for example, a LED device, etc.), and various circuit configurations may be implemented based an operation method, such as a Constant Current Mode Buck Converter or a Quasi Resonant (QR) Buck Converter, etc.

FIG. 1 illustrates a switch control circuit of a QR buck converter, and FIG. 2 illustrates an operation timing diagram of FIG. 1.

In an operation of the QR buck converter circuit illustrated in FIG. 1, when a control signal (GATE) becomes 'high', a control switch is turned on, and an inductor current (IL) flows. Then, a CS voltage, which is a voltage of a sensing resistor connected to a source terminal of the control switch increases, and when the CS voltage increases more than a reference voltage that divides first and second resistors RD1 and RD2, the control signal becomes 'low'. When the control switch is turned off as the control signal is 'low', a drain voltage of the control switch increases, and accordingly, a drain sensing voltage (ZCD) increases. When the inductor current becomes 0 A, the ZCD voltage starts to decrease, and the control signal becomes 'high' again, and the control switch is turned on. The procedure may be repeated.

However, in the QR buck converter circuit of FIG. 1, a predetermined current value of a load and a real current value may be different because of a signal delay (dotted line in FIG. 1) from an input terminal of a comparator where the CS voltage or ZCD voltage is input to a gate terminal of the control switch. It will be described in the discussion related to an operation timing diagram in FIG. 2 below.

FIG. 2 illustrates an operation timing diagram of FIG. 1. Referring to FIG. 2, when the CS voltage is greater than a reference voltage (REF) due to a signal delay (①), the inductor current (IL) may increase in a corresponding manner. Therefore, the inductor current may increase as much as ⓐ. Additionally, when the inductor current is 0 A, the drain sensing voltage (ZCD) may be discharged. In this example, since there is a delay time until the control signal becomes 'high', the inductor current may decrease as much as ⓑ. Generally, a current may increase.

FIGS. 3A and 3B illustrate timing diagrams to change an inductor current according to increasing or decreasing an input voltage.

Referring to FIG. 3A, when the input voltage (VIN) increases, a slope of the inductor current increases, and the inductor current in a section after increasing (ⓒ, ⓓ) a may increase compared with the current in a section before increasing (ⓐ, ⓑ). Specifically, in the section ⓓ, the current increases as much as 'd' region compared with the current in the section ⓑ. The current slightly increases also in the section ⓒ compared with the current in the section ⓐ, but the increased amount is small. In an example, when a current of the section ⓐ is −3 mA, a current of the section ⓒ may be −2 mA, which slightly increases. Since the increased amount is small, a mark of the increased amount is omitted in FIG. 3A.

Referring to FIG. 3B, when the input voltage (VIN) decreases, a slope of the inductor current decreases, and the inductor current in a section after decreasing (ⓒ, ⓓ) a may decrease compared with the current in a section before decreasing (ⓐ, ⓑ). Specifically, in the section ⓓ, the current decreases as much as the 'd' region compared with the current in the section ⓑ. Similarly, the current may also decrease slightly in the section ⓒ compared with the current in the section ⓐ. The decreased amount is omitted since it is small.

As described, a slope of an inductor current may increase or decrease in a typical circuit according to the increase or decrease of an input voltage. Therefore, there may be an error in a load current.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a switch control circuit includes a load, an inductor, a control switch, and a sensing resistor connected in series with an input power source; a second capacitor, a first resistor, and a second resistor connected in series, and configured to sense a drain voltage of the control switch; and a switch controller configured to control the control switch, wherein the switch controller includes: a current compensation device configured to adjust a gate on-time based on a RC resistor and a control signal that senses a gate terminal of the control switch; a first comparator configured to compare a drain sensing voltage with a drain sensing reference voltage; an addition device configured to add an output of the current compensation device to a reference voltage; a second comparator configured to compare an output of the addition device with a sensing voltage of the sensing resistor; and a logic element configured to output the control signal to the control switch based on an output of the first comparator and an output of the second comparator.

The switch control circuit may further include a first capacitor connected in parallel with the load; and a diode configured to rectify a current that is input to the load and the first capacitor.

The current compensation device may include a comparator configured to receive the control signal and a resistor value of the RC resistor; a first MOSFET configured to convert an output of the comparator to a current; a second MOSFET and a third MOSFET configured to induce a mirroring current by mirroring the converted current; a capacitor configured to be charged by the induced mirroring current; a current source connected in parallel with the capacitor; and a buffer configured to output a compensation signal based on a charged value of the capacitor.

The current compensation device may be configured to increase or decrease the reference voltage by a predetermined level based on a change in an input voltage.

In a general aspect, a switch control circuit includes a load, an inductor, a control switch, and a sensing resistor connected in series with an input power source; a second capacitor, a first resistor, and a second resistor connected in series, and configured to sense a drain voltage of the control switch; and a switch controller configured to control the control switch, wherein the switch controller includes a current compensation device configured to adjust a gate on-time based on a RC resistor and a control signal that senses a gate terminal of the control switch; a first comparator configured to compare a drain sensing voltage with a drain sensing reference voltage; an addition device configured to add an output of the current compensation device to a sensing voltage of the sensing resistor; a second comparator configured to compare an output of the addition device with a reference voltage; and a logic element configured to output the control signal to the control switch based on an output of the first comparator and an output of the second comparator.

The switch control circuit may include a first capacitor connected in parallel with the load; and a diode configured to rectify a current that is input in the load and the first capacitor.

The current compensation device may include a comparator configured to receive the control signal and a resistor value of the RC resistor; a first MOSFET configured to convert an output of the comparator to a current; a second MOSFET and a third MOSFET configured to induce a mirroring current by mirroring the converted current; a capacitor configured to be charged by the induced mirroring current; a current source connected in parallel with the capacitor; and a buffer configured to output a compensation signal based on a charged value of the capacitor.

The current compensation device may be configured to increase or decrease the sensing voltage by a predetermined level based on a change in an input voltage.

In a general aspect, a switch control method includes determining a change in an input voltage; changing a reference voltage that is compared with a sensing voltage of a sensing resistor based on the determined change in the input voltage; and compensating an error of an inductor current by changing a state of a control signal from 'high' to 'low', by comparing the sensing voltage with the changed reference voltage.

The switch control may be performed in a switch control circuit of a QR buck converter.

After the input voltage is changed, during a period when the control signal maintains a 'high' state for a first time, a gate on-time may be adjusted by sensing a gate terminal of a control switch.

The gate on-time may decrease when the input voltage increases, and the gate on-time may increase when the input voltage decreases.

After the input voltage is changed, from a period when the control signal maintains a 'high' state for a second time, a gate on-time may be constantly maintained.

When the input voltage increases, the reference voltage may decrease, and when the input voltage decreases, the reference voltage may increase.

In a general aspect, a switch control method includes determining a change in an input voltage; changing a sensing voltage of a sensing resistor that is compared with a reference voltage based on the determined change in the input voltage; and compensating an error of an inductor current by changing a state of a control signal from 'high' to 'low', by comparing the changed sensing voltage with the reference voltage.

The switch control may be performed in a switch control circuit of a QR buck converter.

After the input voltage is changed, during a period when the control signal maintains a 'high' state for a first time, a gate on-time may be adjusted by sensing a gate terminal of a control switch.

The gate on-time may decrease when the input voltage increases, and the gate on-time may increase when the input voltage decreases.

After the input voltage is changed, from a period when the control signal maintains a 'high' state for a second time, a gate on-time may be constantly maintained.

When the input voltage increases, the sensing voltage may increase, and when the input voltage decreases, the sensing voltage may decrease.

Other features and aspects will be apparent from the following detailed description, the drawings, and the claims.

BRIEF DESCRIPTION OF DRAWINGS

FIG. 2 illustrates an operation timing diagram of FIG. 1.

FIGS. 3A and 3B illustrate timing diagrams to change an inductor current according to the increase or decrease of an input voltage.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
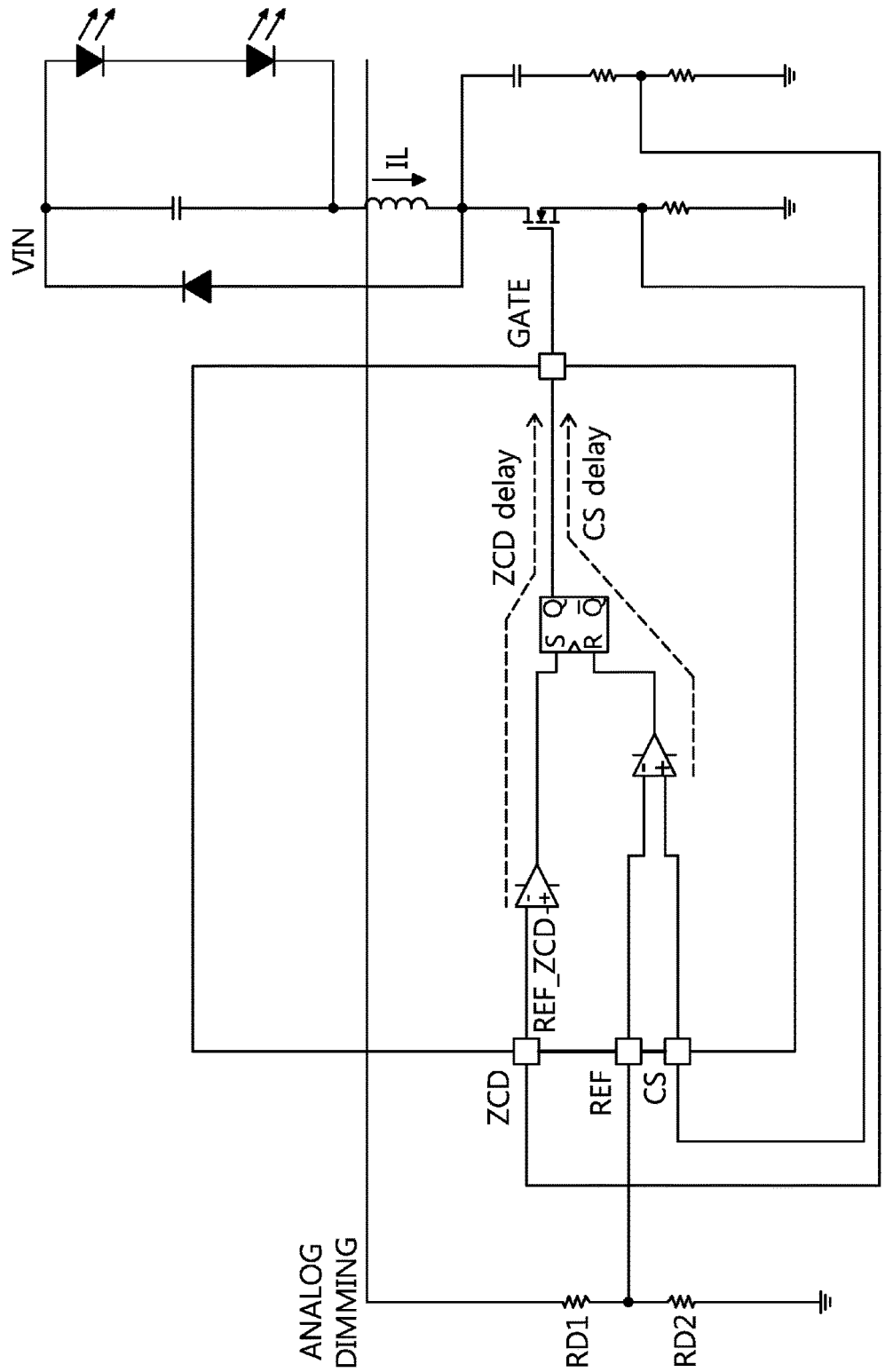
FIG. 1 illustrates a switch control circuit of a QR buck converter.
Figure 3A:
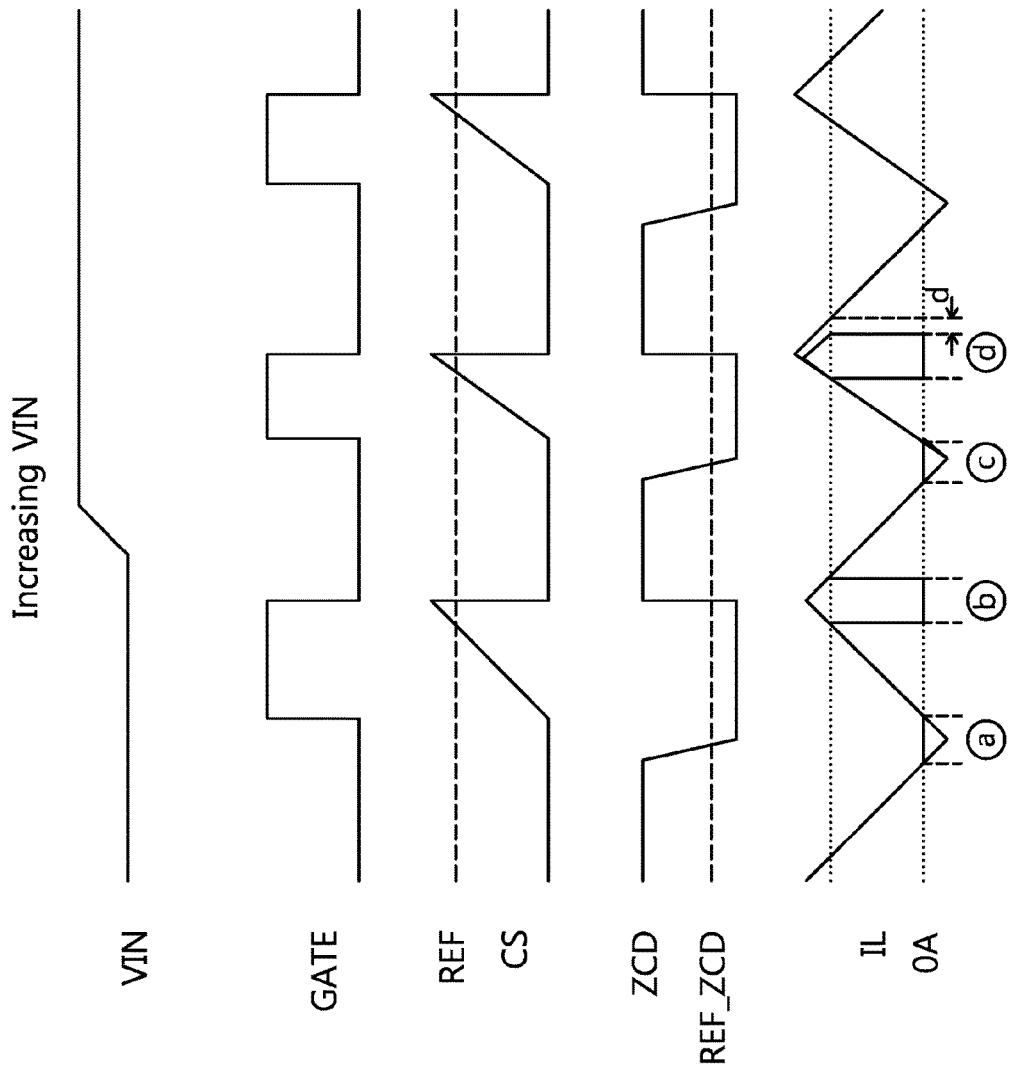

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The one or more examples may solve problems related to the above technical issue. By changing a reference voltage or a sensing voltage with responding to a change of an input voltage, the one or more examples may provide a switch control circuit and switch control method thereof to compensate an error of a load current according to a change of an input voltage.

The one or more examples may compensate an error of a load current that occurs due to a change of a slope of an inductor current according to increasing and decreasing an input voltage.

The detailed description will be given below, with attached drawings.

Figure 4:
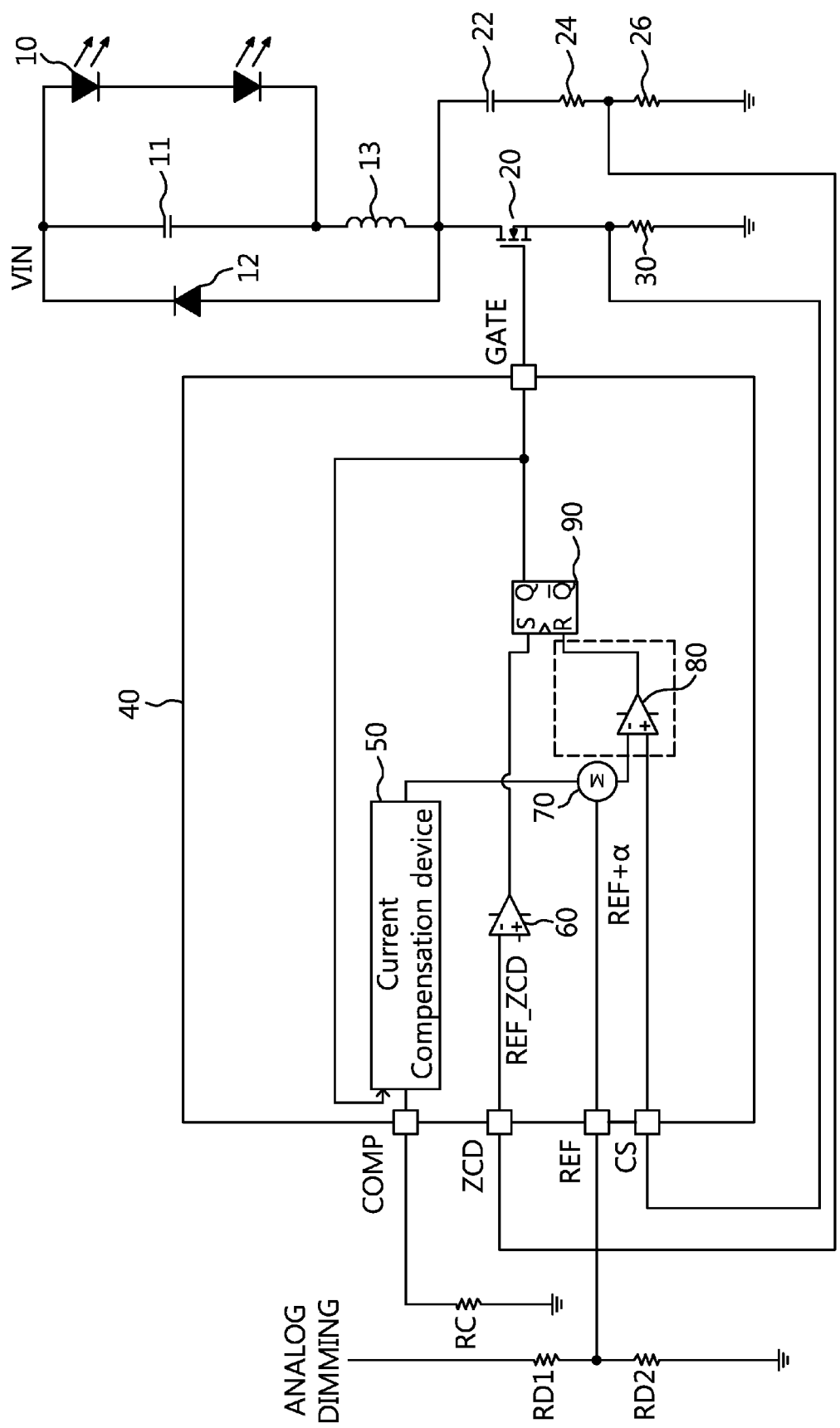
FIG. 4 illustrates an example switch control circuit diagram of a QR buck converter in accordance with one or more embodiments.

FIG. 4 illustrates an example switch control circuit diagram of a QR buck converter in accordance with one or more embodiments. A QR buck converter is discussed as an example of a switch control circuit in the one or more examples.

An example switch control circuit illustrated in FIG. 4 may include a first capacitor 11 connected in parallel with a load, for example one or more light-emitting devices 10, a diode 12 that rectifies a current that is input in the light-emitting device 10 and the first capacitor 11, and an inductor 13 connected in series with the one or more light-emitting devices 10 and the first capacitor 11, respectively. A control switch 20 (MOSFET) may be connected in series with a sensing resistor 30 between the inductor 13 and a ground terminal.

To sense a drain voltage of the control switch 20, a second capacitor 22, a first resistor 24, a second resistor 26 may be connected in series.

Additionally, a switch controller 40 may be configured to control the control switch 20 to perform turn-on and turn-off operations. The switch controller 40 may be configured to include a current compensation device 50 that outputs a compensation signal by sensing a control signal (GATE) that is input to a gate terminal of the control switch 20, a first comparator 60 that compares a ZCD voltage with a ZCD reference voltage (REF_ZCD), an addition device 70 that adds an output of the current compensation device 50 to a reference voltage (REF), a second comparator 80 that compares an output of the addition device 70 with a CS voltage, and a logic element 90 that is a SR latch that outputs a control signal to the control switch 20 according to outputs of the first comparator 60 and the second comparator 80.

In FIG. 4, the current compensation device 50 may adjust a 'gate on-time', which is a time when a control switch maintains a turned-on state, by based on a RC resistor and a control signal (GATE) that senses a gate terminal of the control switch 20. The gate on-time may increase or decrease according to increasing or decreasing of an input voltage. Additionally, a reference voltage (REF) may be set by a distribution resistor value of an analog dimming first resistor RD1 and an analog dimming second resistor RD2.

Figure 5:
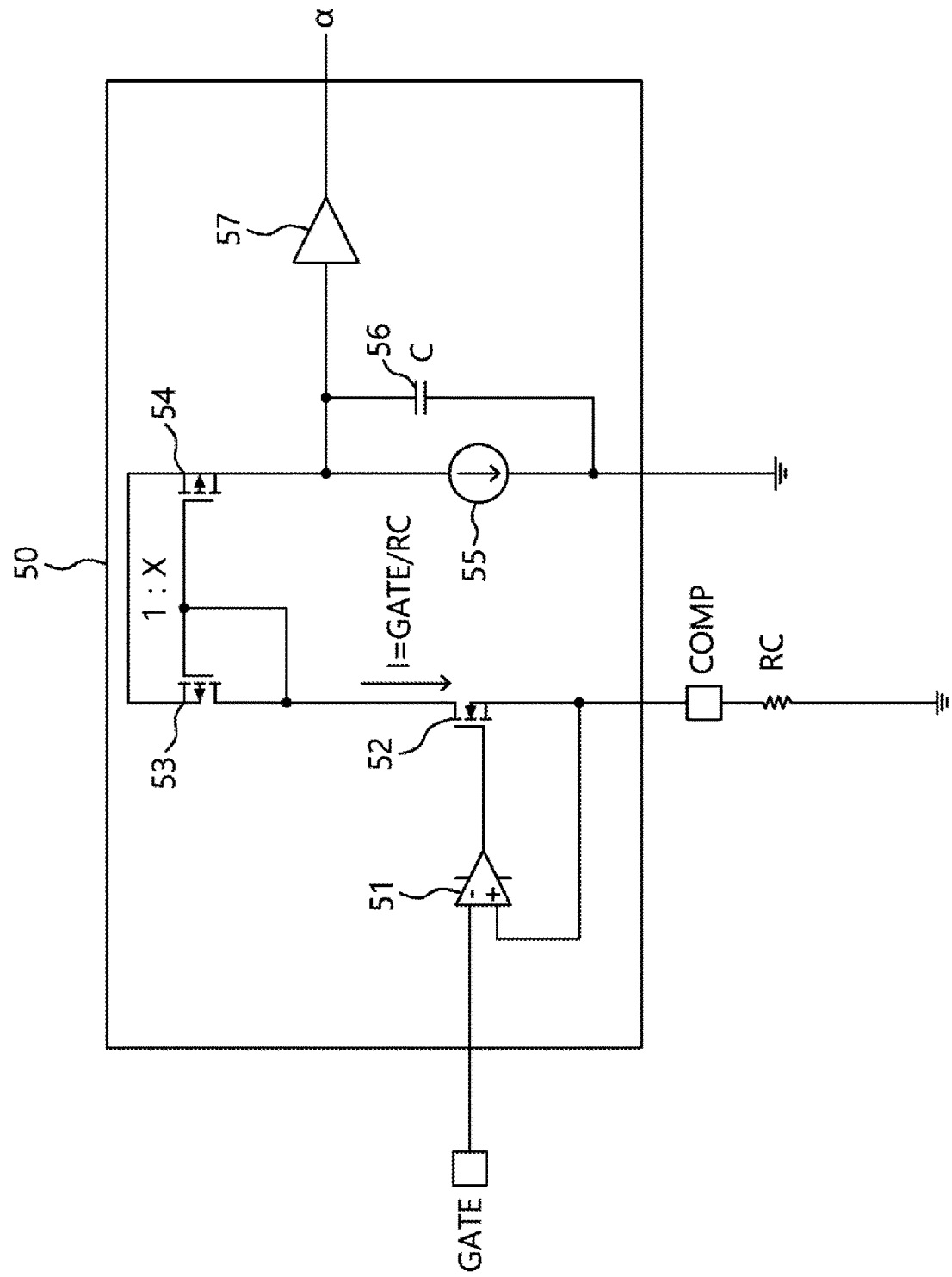
FIG. 5 illustrates an inner circuit diagram of a current compensation device of FIG. 4.

FIG. 5 illustrates an inner circuit diagram of a current compensation device 50 of FIG. 4.

In one or more examples, the current compensation device 50 may be configured to include a comparator 51, a first MOSFET 52, a second MOSFET 53, a third MOSFET 54, a current source 55, a capacitor 56, and a buffer 57.

The current compensation device 50 as illustrated in FIG. 5 may receive a RC resistor value and the control signal (GATE), convert the received RC resistor value and the control signal (GATE) into a current, and perform a current mirroring based on the second MOSFET 53 and the third MOSFET 54, which may have different sizes. A compensation signal (a) may be output by repeatedly charging and discharging the current-mirrored value through the capacitor 56. When an input voltage increases, a gate on-time (Ontime) of a control signal may decrease. Then, a charging section of the capacitor may decrease before increasing the input voltage, and therefore, a negative a value may be output. On the other hand, when the input voltage decreases, a gate on-time (On-time) of a control signal may increase. Then, a charging section of the capacitor may increase before the input voltage is decreased, and therefore, a positive a value may be output.

That is, the current compensation device 50 may output the a value to be added to, or subtracted from, a reference voltage or a sensing voltage, based on a change of the input voltage. Accordingly, an error of a load current may be compensated. The detailed procedure to compensate an error of a load current will be described in timing diagrams of FIGS. 6 to 10.

Next, compensating an error of an inductor current is described according to a change of an input voltage in a switch control circuit in accordance with one or more embodiments.

Figure 6:
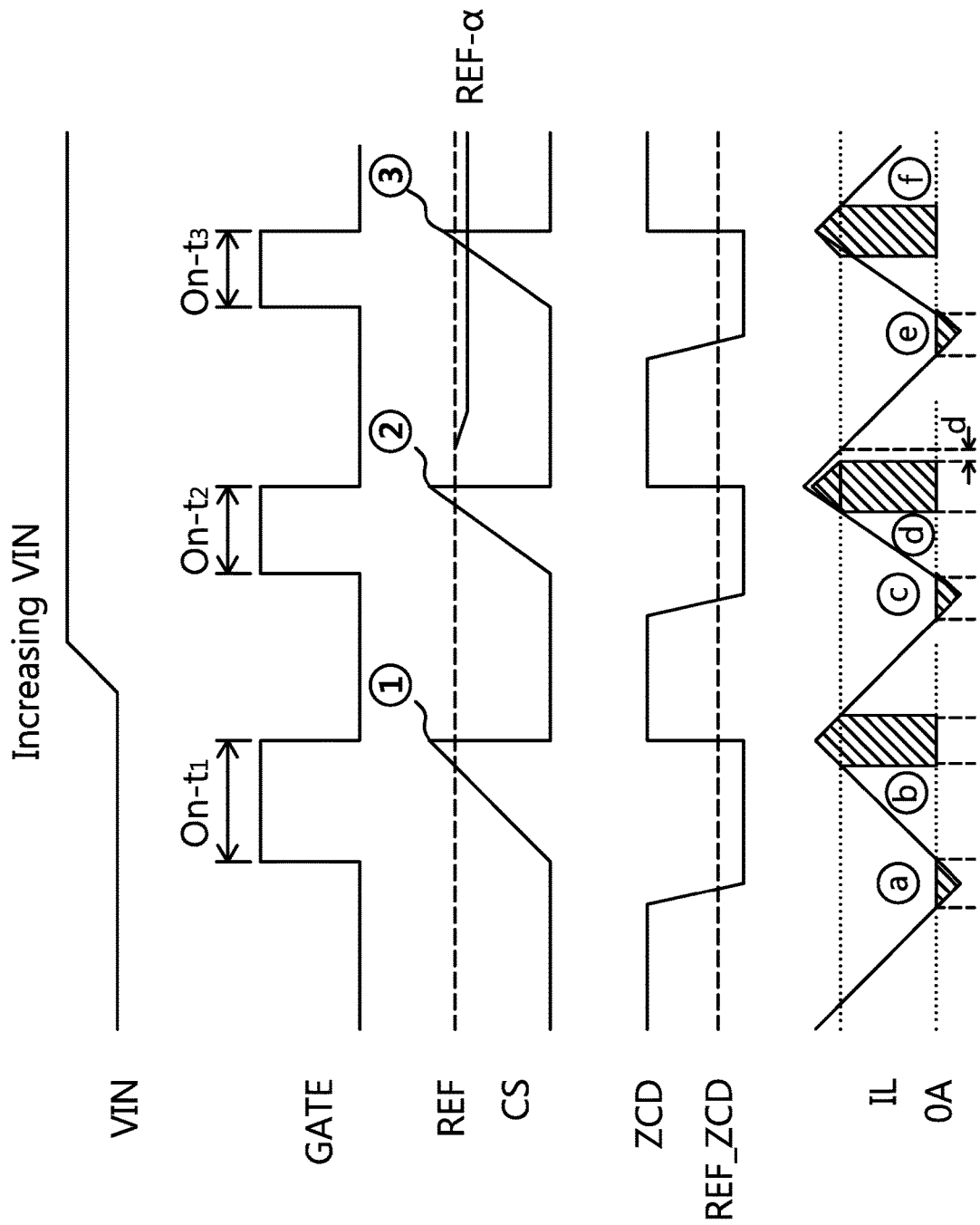
FIG. 6 illustrates a timing diagram when an input voltage increases in the switch control circuit of FIG. 4.

FIG. 6 illustrates a timing diagram when an input voltage increases in the switch control circuit of FIG. 4.

Referring to FIG. 6, when the control switch is turned off before the input voltage is increased, the ZCD voltage may start to decrease when the inductor current becomes 0 A. Based on a comparison result of the first comparator 60, a control signal to turn on the control switch may be output when the ZCD voltage may be lower than the ZCD reference voltage (REF_ZCD). The control signal may be output later because an error may occur by a signal delay.

Additionally, based on a comparison result of the first comparator 60, when the ZCD voltage is lower than the ZCD reference voltage (REF_ZCD), the inductor current may increase. Subsequently, when the inductor current increases, the control signal may become 'high', and the CS voltage may increase. Additionally, when the CS voltage become greater than the reference voltage and reaches a peak ①, the control signal may become 'low'. According to a 'low' state of the control signal, the inductor current may decrease, and the ZCD voltage may increase. Likewise, when the control switch is turned off, the control signal may be output later because an error may occur based on a signal delay.

As illustrated in FIG. 6, when the input voltage increases during a circuit operation, after the input voltage increases, the ZCD voltage may decrease when the inductor current becomes 0 A. The control signal may become 'high' in a section where the ZCD voltage maintains a state to be lower than the ZCD reference voltage (REF_ZCD). At the time when the control signal is 'high', when the CS voltage is greater than the reference voltage and reaches a peak ②, the control signal may become 'low', and the inductor current may decrease. In this example, since a slope of the inductor current increases when the input voltage increases, a gate on-time On-t2 may be shorter than a gate on-time On-t1 that is before increasing the input voltage.

Accordingly, in a wave describing the inductor current of FIG. 6, there may be a current error of the 'd' region between the ⓐ, ⓑ sections that are inductor current values before increasing the input voltage, and the ⓒ, ⓓ sections that are inductor current values after increasing the input voltage. That is, the current may increase as much as 'd'. In the one or more examples, ⓒ may be slightly higher than ⓐ, but the increased amount is omitted since it is small.

The one or more examples may compensate an error that occurs after increasing an input voltage. Accordingly, a reference voltage should decrease as much as the occurred current error. That is, a reference voltage (REF-α) that decreases as much as a predetermined level may be provided to be compared with a CS voltage.

A reference voltage (REF-α) may be generated by decreasing the reference voltage by implementing the current compensation device 50 of FIG. 5. The generated reference voltage (REF-α) may be a voltage that is compared with the CS voltage when the control signal is changed from 'high' to 'low'. Correspondingly, a peak value ③ of the CS voltage may decrease. Accordingly, the control switch may be turned off faster, and in the inductor current value of the ⓕ section in FIG. 6, an error 'd' that occurs in the ⓓ section may be consequently compensated. Based on a compensation result, the inductor current value of the ⓕ section may become similar to the value of the ⓑ section, which is before increasing the input voltage.

As described, when the input voltage increases, a current error may be compensated by decreasing a gate on-time. That is, when the input voltage increases, by calculating the gate on-time, the reference voltage may decrease by as much as a predetermined level. After the input voltage increases, the gate on-time may maintain the decreased state until the input voltage is changed again. That is, although a gate on-time On-t4, On-t5 . . . is not shown in FIG. 6, the gate on-time On-t4, On-t5 . . . may be identical with gate on-time On-t3. In other words, On-t3=On-t4=On-t5= . . .

Figure 7:
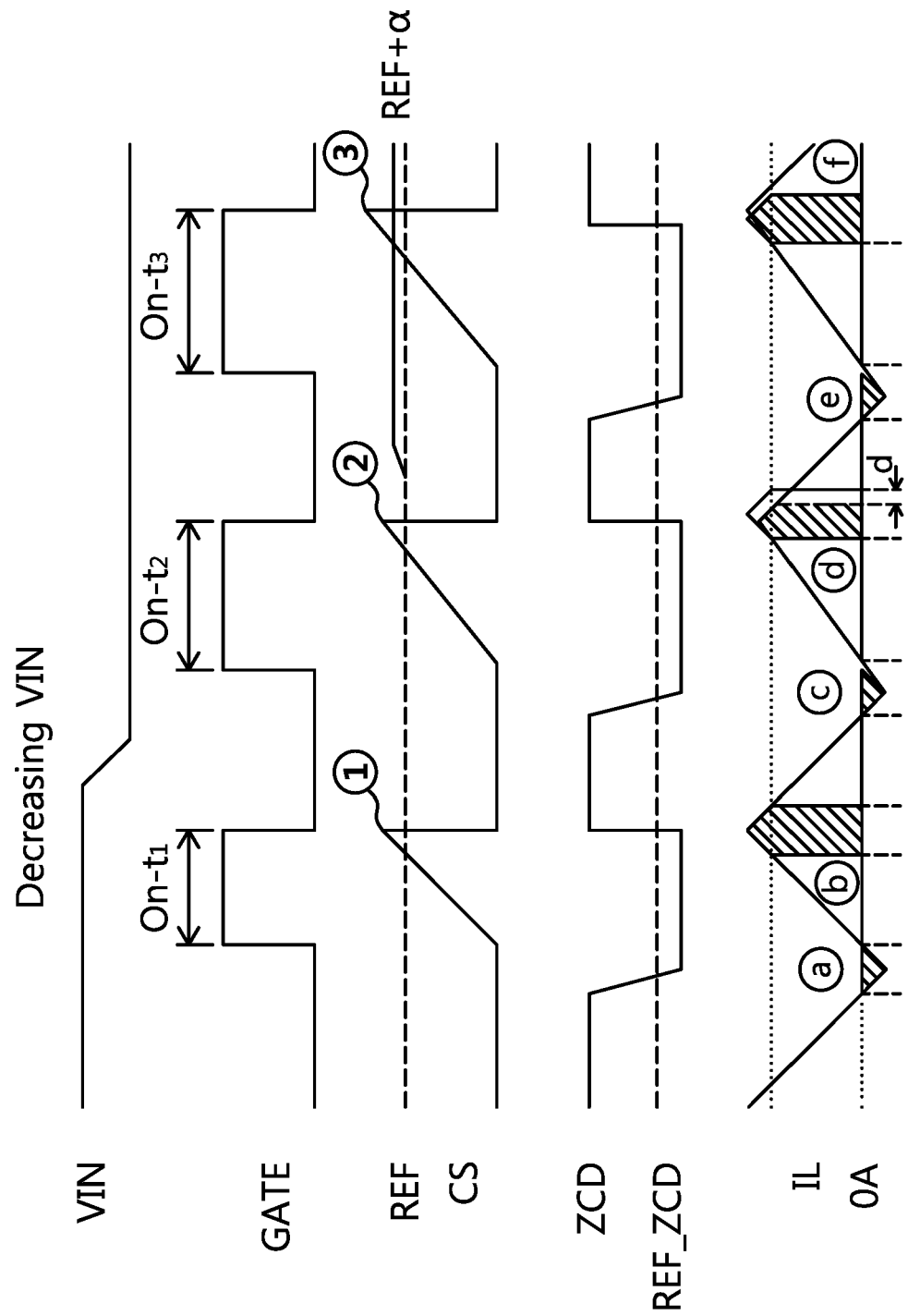
FIG. 7 illustrates a timing diagram when an input voltage decreases in the switch control circuit of FIG. 4.

FIG. 7 illustrates a timing diagram that describes when an input voltage decreases in a switch control circuit of FIG. 4.

Referring to FIG. 7, with the control switch turned off, the ZCD voltage may start to decrease when the inductor current becomes 0 A. By a comparison result of the first comparator 60, a signal to turn on the control switch may be output when the ZCD voltage becomes lower than the ZCD reference voltage (REF_ZCD), and there may be an error by a signal delay until the control switch is turned on. Likewise, when the control switch is turned off, the control signal may be output later because of an error by a signal delay.

Additionally, based on a comparison result of the first comparator 60, when the ZCD voltage is lower than the ZCD reference voltage (REF_ZCD), the inductor current may increase. Subsequently, when the inductor current increases, the control signal may become 'high', and the CS voltage may increase. When the CS voltage becomes greater than the reference voltage (REF) and reaches a peak ① the control switch may be turned off. According to a turn-off state of the control switch, the inductor current may decrease, and the ZCD voltage may increase.

As illustrated in FIG. 7, when the input voltage decreases during a circuit operation, after the input voltage decreases, the ZCD voltage may decrease when the inductor current becomes 0 A. The control signal may be 'high' in a section where the ZCD voltage maintains a state that is lower than the ZCD reference voltage (REF_ZCD). At the time when the control signal is 'high', when the CS voltage becomes greater than the reference voltage and reaches a peak ②, the control signal may become 'low', and the inductor current may decrease. In this example, since a slope of the inductor current decreases as the input voltage decreases, a gate on-time On-t2 may increase compared with a gate on-time On-t1 before decreasing the input voltage.

Accordingly, in a wave describing the inductor current of FIG. 7, there is a current error of the 'd' region between the ⓐ, ⓑ sections that are inductor current values before decreasing the input voltage, and the ⓒ, ⓓ sections that are inductor current values after decreasing the input voltage. That is, the current may decrease as much as 'd'. In the one or more examples, ⓒ may be slightly lower than ⓐ. However, the decreased amount is omitted since it is small.

The one or more examples may compensate an error that occurs after an input voltage is decreased. Accordingly, a reference voltage should increase as much as the occurred current error. That is, a reference voltage (REF+α) that increases as much as a predetermined level may be provided to be compared with a CS voltage.

The reference voltage (REF+α) may be generated by increasing the reference voltage by implementing the current compensation device 50 of FIG. 5. The generated reference voltage (REF+α) may be a voltage that is compared with the CS voltage when the control signal is changed from 'high' to 'low'. Correspondingly, a peak value of the CS voltage may increase. Accordingly, the control switch may be turned off later, and in the inductor current value of the ⓕ section in FIG. 7, an error 'd' that occurs in the a section may be consequently compensated. Based on a compensation result, the inductor current value of the ⓕ section may become similar to the value of the ⓑ section, which is before decreasing the input voltage.

Likewise, when the input voltage decreases, a current error may be compensated by increasing a gate on-time. That is, when the input voltage decreases, by calculating the gate on-time, the reference voltage may increase by as much as a predetermined level. After the input voltage decreases, the gate on-time may maintain the increased state until the input voltage is changed again. That is, although a gate on-time On-t4, On-t5 . . . is not shown in FIG. 7, the gate on-time On-t4, On-t5 . . . may be identical with the gate on-time On-t3. (On-t3=On-t4=On-t5= . . . )

As described above, when there is an error in an inductor current due to the increase or decrease of an input voltage, the one or more examples may compensate the error by decreasing or increasing a reference voltage by a predetermined level. Additionally, the one or more examples may compare the decreased or increased reference voltage with a CS voltage when a control signal maintains a 'high' state for the second time after a change of the input voltage, and it may adjust a gate on-time.

In one or more examples, an output value of a current compensation device 50 may be applied to a CS voltage value.

Figure 8:
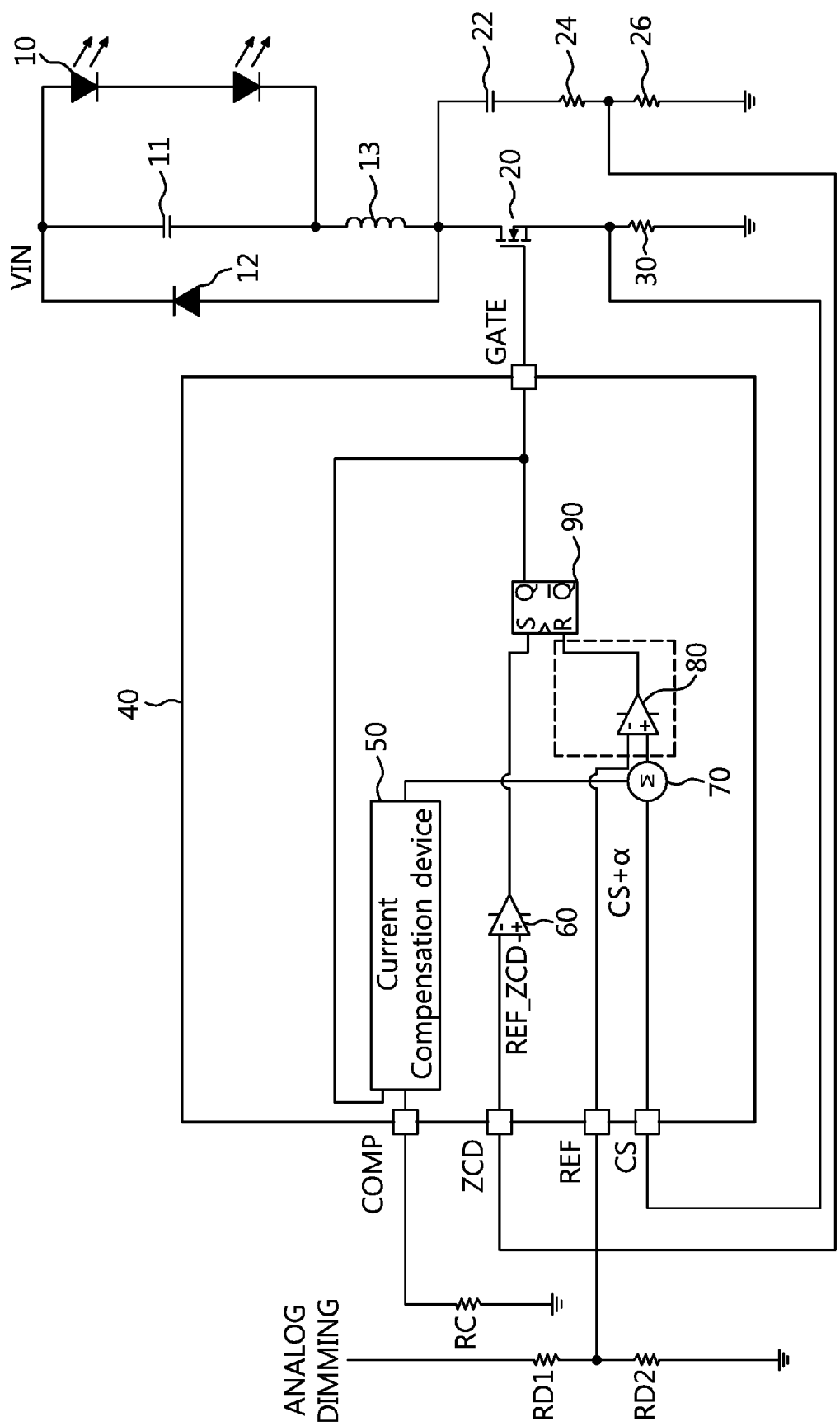
FIG. 8 illustrates a switch control circuit diagram of a QR buck converter in accordance with one or more embodiments.

FIG. 8 illustrates an example switch control circuit diagram of a QR buck converter in accordance with one or more embodiments.

The example switch control circuit diagram of FIG. 8 may have the same configuration of the switch control circuit diagram as illustrated in FIG. 4, which was described earlier. The difference is that an output of the current compensation device 50 may be applied to the CS voltage. A description for a circuit configuration is omitted because it is the same as the circuit configuration of FIG. 4, and an operation timing diagram will be described.

Figure 9:
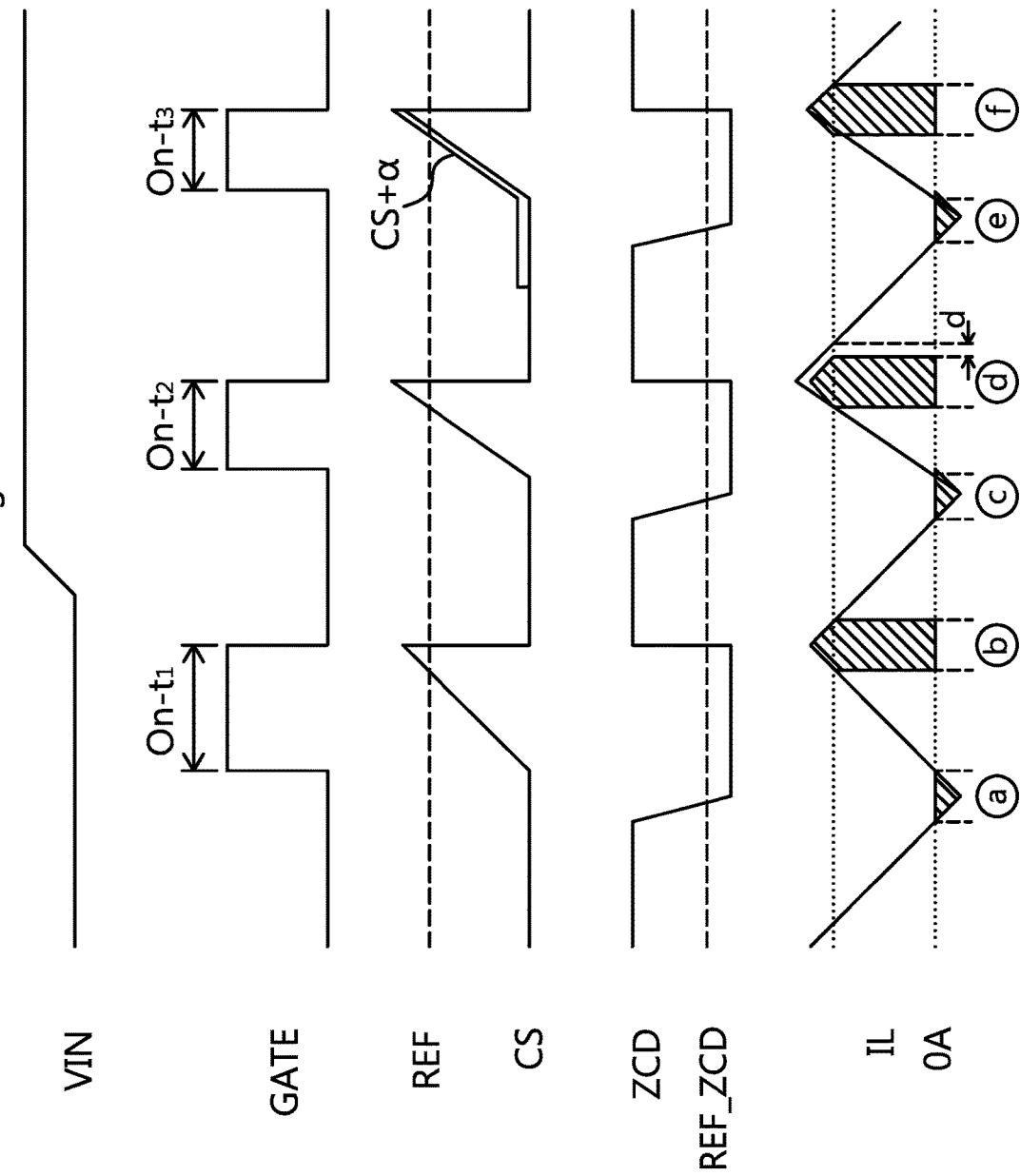
FIG. 9 illustrates a timing diagram when an input voltage increases in the switch control circuit of FIG. 8.

FIG. 9 illustrates a timing diagram when an input voltage increases in the switch control circuit of FIG. 8.

Referring to FIG. 9, in a section before the input voltage increases, the inductor current may be same in the ⓐ, ⓑ sections. Subsequently, when the input voltage increases, as a slope of the inductor current increases, the inductor current may increase as illustrated in the ⓒ, ⓓ sections after increasing the input voltage. In FIG. 9, the current may increase as much as 'd', and therefore, an error may occur.

To compensate an error of the inductor current, the CS voltage may increase by implementing the current compensation device 50. When the control signal is changed from 'high' to 'low', the increased CS voltage (CS+α) may be compared with the reference voltage (REF). Since the CS voltage increases, inductor current values in the ⓔ, ⓕ sections of FIG. 9 may be similar to the values in the ⓐ, ⓑ sections, which are before increasing the input voltage. Consequently, in the inductor current value of the ⓕ section in FIG. 9, an error 'd' that occurs in the ⓓ a section may be compensated.

Figure 10:
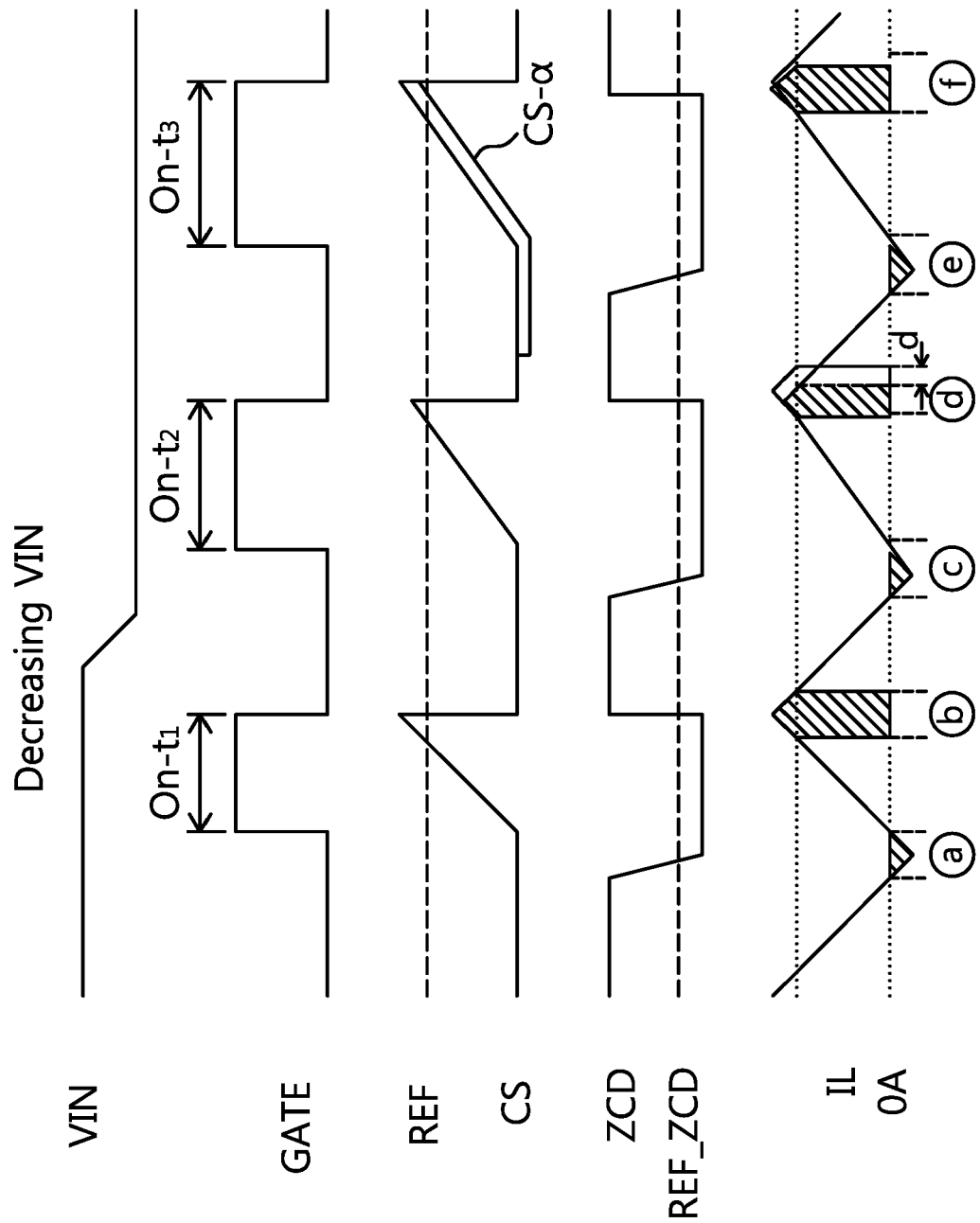
FIG. 10 illustrates a timing diagram when an input voltage decreases in the switch control circuit of FIG. 8.

FIG. 10 illustrates a timing diagram when an input voltage decreases in a switch control circuit of FIG. 8.

Referring to FIG. 10, in a section before the input voltage decreases, the inductor current may be same as the ⓐ, ⓑ sections. Subsequently, when the input voltage decreases, as a slope of the inductor current decreases, the inductor current may decrease in a section where the control signal becomes 'high' for the first time after decreasing the input voltage, as in the ⓒ, ⓓ sections. In FIG. 10, the current may decrease as much as 'd', and therefore, an error may occur.

To compensate an error of the inductor current, the CS voltage may decrease by implementation of the current compensation device 50. After the CS voltage decreases, and when the control signal is changed from 'high' to 'low' for the second time, the decreased CS voltage (CS−α) may be compared with the reference voltage. Since the CS voltage decreases, the inductor current may increase in a corresponding manner. Accordingly, inductor current values in the ⓔ, ⓕ sections may be similar to values in the ⓐ, ⓑ sections, which are before decreasing the input voltage. Consequently, in the inductor current value of the ⓕ section in FIG. 10, an error 'd' that occurs in the ⓓ section may be compensated.

As described in FIGS. 9 to 10, when there is an error in an inductor current due to the increase or decrease of an input voltage, the switch control circuit in accordance with one or more embodiments may compensate the error by increasing or decreasing a sensing voltage by a predetermined level. That is, when a control signal maintains a 'high' state for the second time after a change of an input voltage, an increased or decreased sensing voltage may be compared to a reference voltage, and a gate on-time may be adjusted. Additionally, after a change of an input voltage, a gate on-time may maintain the adjusted state until the input voltage is changed again. That is, although a gate on-time On-t4, On-t5 . . . is not shown in FIGS. 9 to 10, the gate on-time On-t4, On-t5 . . . may be identical with the gate on-time On-t3. (On-t3=On-t4=On-t5= . . . )

According to a switch control circuit and a switch control method of the one or more examples, although an input voltage may increase or decrease that is applied to a switch control circuit, by changing and outputting a reference voltage or a sensing voltage with responding to the change of an input voltage, an error of a load current according to the change of an input voltage may be compensated.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switch control circuit, comprising:
    a load, an inductor, a control switch, and a sensing resistor connected in series with an input power source;
    a second capacitor, a first resistor, and a second resistor connected in series, and configured to sense a drain voltage of the control switch; and
    a switch controller configured to control the control switch,
    wherein the switch controller comprises:
        a current compensation device configured to adjust a gate on-time based on a RC resistor and a control signal that senses a gate terminal of the control switch;
        a first comparator configured to compare a drain sensing voltage with a drain sensing reference voltage;
        an addition device configured to add an output of the current compensation device to a reference voltage;
        a second comparator configured to compare an output of the addition device with a sensing voltage of the sensing resistor; and
        a logic element configured to output the control signal to the control switch based on an output of the first comparator and an output of the second comparator.

2. The switch control circuit of claim 1, further comprising:
    a first capacitor connected in parallel with the load; and
    a diode configured to rectify a current that is input to the load and the first capacitor.

3. The switch control circuit of claim 1, wherein the current compensation device comprises:
    a comparator configured to receive the control signal and a resistor value of the RC resistor;
    a first MOSFET configured to convert an output of the comparator to a current;
    a second MOSFET and a third MOSFET configured to induce a mirroring current by mirroring the converted current;
    a capacitor configured to be charged by the induced mirroring current;
    a current source connected in parallel with the capacitor; and
    a buffer configured to output a compensation signal based on a charged value of the capacitor.

4. The switch control circuit of claim 1, wherein the current compensation device is configured to increase or decrease the reference voltage by a predetermined level based on a change in an input voltage.

5. A switch control circuit, comprising:
    a load, an inductor, a control switch, and a sensing resistor connected in series with an input power source;
    a second capacitor, a first resistor, and a second resistor connected in series, and configured to sense a drain voltage of the control switch; and
    a switch controller configured to control the control switch,
    wherein the switch controller comprises:
        a current compensation device configured to adjust a gate on-time based on a RC resistor and a control signal that senses a gate terminal of the control switch;
        a first comparator configured to compare a drain sensing voltage with a drain sensing reference voltage;
        an addition device configured to add an output of the current compensation device to a sensing voltage of the sensing resistor;
        a second comparator configured to compare an output of the addition device with a reference voltage; and
        a logic element configured to output the control signal to the control switch based on an output of the first comparator and an output of the second comparator.

6. The switch control circuit of claim 5, further comprising:
    a first capacitor connected in parallel with the load; and
    a diode configured to rectify a current that is input in the load and the first capacitor.

7. The switch control circuit of claim 5, wherein the current compensation device comprises:
    a comparator configured to receive the control signal and a resistor value of the RC resistor;
    a first MOSFET configured to convert an output of the comparator to a current;
    a second MOSFET and a third MOSFET configured to induce a mirroring current by mirroring the converted current;
    a capacitor configured to be charged by the induced mirroring current;
    a current source connected in parallel with the capacitor; and
    a buffer configured to output a compensation signal based on a charged value of the capacitor.

8. The switch control circuit of claim 5, wherein the current compensation device is configured to increase or decrease the sensing voltage by a predetermined level based on a change in an input voltage.

* * * * *